United States Patent

[11] 3,583,813

| [72] | Inventors | Kazuo Shibata<br>Tokyo;<br>Yoshio Fukuda, Osaka, both of, Japan |
|---|---|---|
| [21] | Appl. No. | 861,201 |
| [22] | Filed | Sept. 25, 1969 |
| [45] | Patented | June 8, 1971 |
| [73] | Assignee | Shimadzu Susakusho Ltd.<br>Kyoto, Japan |
| [32] | Priority | Feb. 6, 1965 |
| [33] | | Japan |
| [31] | | 40-6427<br>Continuation of application Ser. No.<br>525,066, Feb. 4, 1966, now abandoned. |

[54] SPECTROPHOTOMETER
2 Claims, 2 Drawing Figs.

[52] U.S. Cl. .................................................. 356/89,
250/226, 356/93, 356/95
[51] Int. Cl. ................................................... G01j 3/42
[50] Field of Search.......................................... 356/74, 80,
89, 95, 93; 220/226

[56] References Cited
UNITED STATES PATENTS

| 2,437,323 | 3/1948 | Heigl et al.................. | 263/19 |
| 3,123,660 | 3/1964 | Matthews...................... | 356/89 |
| 3,183,764 | 5/1965 | Sundstrom .................... | 356/89 |
| 3,334,537 | 8/1967 | Beattie ......................... | 356/95 |
| 3,459,479 | 8/1969 | Sundstrom et al............ | 356/89 |

FOREIGN PATENTS

| 869,194 | 5/1961 | Great Britain................ | 88/14FB |

OTHER REFERENCES

" Chemical Instrumentation" by Howard A. Strobel; Addison-Wesley Publishing Company, Inc., Reading, Mass; Copyright 1960; pg. 208— 213.

Primary Examiner—Ronald L. Wibert
Assistant Examiner—V. P. McGraw
Attorney—Fidelman, Waffle & Leitner ABSTRACT: A spectrophotometer having a monochromatic light source, a prism, a slit for varying the amount of light, a beam splitting device, a photosensor and amplifier for each split beam, an attenuator for one beam and a level adjuster for the other, a ratio recorder with a double-throw switch for recording positive or negative readings, and a control mechanism operable on a signal related to the attenuated light to widen or narrow the slit.

SPECTROPHOTOMETER

This is a continuation of application of Ser. No. 525,066, filed Feb. 4, 1966 and now abandoned.

This invention relates to a spectrophotometer and, more particularly, to a double-beam, double-detector-type of spectrophotometer.

In spectrophotometers of this type, a monochromatic light at a sequence of wavelengths is split into two separate beams, which are separately passed through a reference sample and an unknown sample and received by two separate detectors. In the spectrophotometer with which this invention is concerned, a recorder compares the outputs of the two detectors and indicates the ratio therebetween.

When a unknown sample to be measured by a spectrophotometer of this type is of a high concentration, the light beam passing through the sample is greatly attenuated so that the corresponding signal from the detector is very small in magnitude as compared with the signal corresponding to the light beam that has passed through the reference sample. In conventional spectrophotometers, therefore, the signal on the unknown sample side is amplified much more than that on the reference sample side in an attempt to raise the level of the former signal up to that of the latter. This means, however, that since the signal on the unknown sample side is to be passed through an amplifier having a high gain, not only the signal but also noise are amplified, with resulting introduction of errors into the measurement. For accurate measurement, therefore, it will be necessary to amplify the signal component only and not noise, that is, to make the signal-to-noise ratio as great as possible.

Accordingly, one object of this invention is to provide a double-beam, double-detector-type of spectrophotometer, which is capable of very accurate measurement of samples of high concentrations without use of an amplifier having such a high gain and yet with a great signal-to-noise ratio.

Another object of the invention is to provide a spectrophotometer as aforesaid which is capable of measuring and recording the spectra of samples of high concentrations in enlarged scale.

Another object of the invention is to provide a spectrophotometer as aforesaid which is capable of measuring and recording the spectra of samples of high concentrations in enlarged scale.

Another object of the invention is to provide a spectrophotometer as aforesaid which makes the measurement of samples of high concentrations easier than in the prior art.

Still another object of the invention is to provide a spectrophotometer as aforesaid in which raising or lowering of the base line of absorbance can be effected with ease, thereby making it easier to measured difference spectra of various samples.

Other objects, features and advantages of the invention will become more apparent from the following description of preferred embodiments thereof with reference to the accompanying drawings, wherein like reference symbols denote like parts, and wherein.

Figure 1:
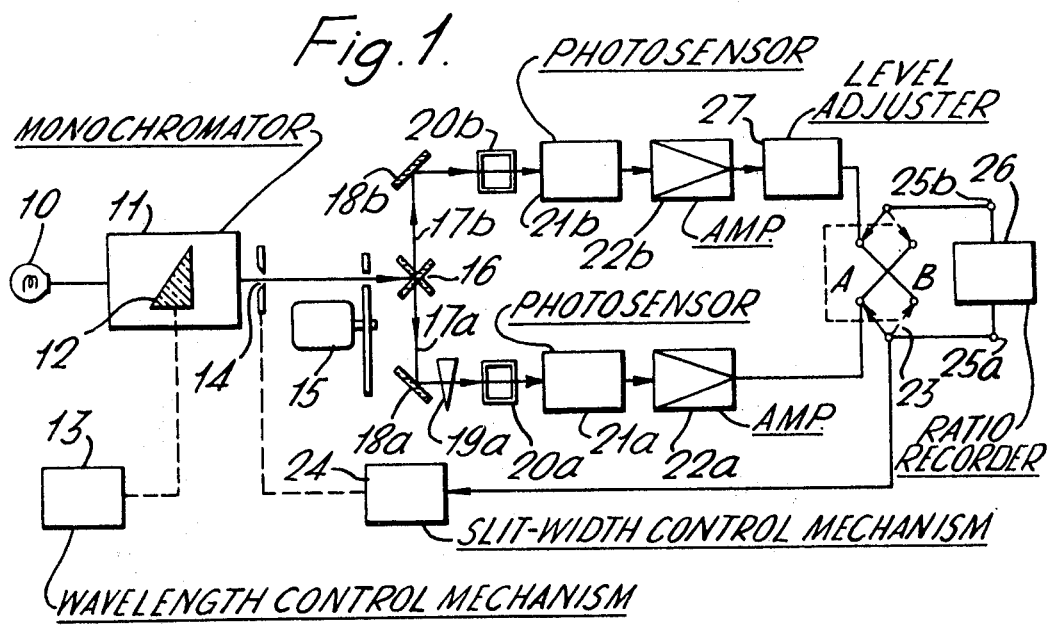
FIG. 1 is a schematic diagram of one embodiment of the invention.

Referring now in detail to the drawings, first to FIG. there is shown a source of light 10 which is adapted to produce a light over a required range of wavelengths. The light from the source enters a monochromator 11 including a prism 12 which disperses the light into different wavelengths. A wavelength control mechanism 13 controls the prism so as to select a desired wavelength from the different wavelengths. The selected monochromatic light is passed through an exit slit 14 and a chopper 15 to a beam splitter 16, which splits the light into two beams 17a and 17b. Hereinafter, the beam 17a will be referred to as the "reference sample beam," while the beam 17b, as the "unknown sample beam." The reference sample beam 17a is directed by a reflector 18a to pass through an optical attenuator 19a and a container or cell 20a adapted to contain a reference sample and then is detected by a photosensor 21a such as a photomultiplier tube. The photosensor converts the optical input into a corresponding electrical signal, which will be referred to as the reference sample signal. The reference sample signal is amplified by an amplifier 22a and the amplified signal is applied via a transfer switch 23 to a slit-width control mechanism 24 on one hand and to one of the input terminals 25a of a ratio recorder 26 on the other hand, The slit-width control mechanism 24 regulates the width of the slit 14 in response to the reference sample signal from the amplifier 23a so as to keep the signal at a substantially constant level.

The unknown sample beam 17b is directed by a reflector 18b to pass through a container or cell 20b and then is detected by a photosensor 21b. The output signal from the photosensor, to be referred to as the unknown sample signal, is amplified by an amplifier 22b, and the amplified signal is passed through a level adjuster 27 and then applied via the switch 23 to the other of the input terminals 25b of the ratio recorder 26. The recorder compares the two input signals and records the ratio therebetween.

It will be seen that when the switch 23 is in one thrown-in position, which will be referred to as "position A," that is, thrown in to the left hand-side as viewed in the figure, the reference sample signal and the unknown sample signal are applied to the input terminals 25a and 25b of the recorder 26, respectively; while when the switch is in the opposite thrown-in "position B," the signals are applied to the input terminals oppositely.

The amplifiers 22a and 22b are such that they include a network for correcting errors that may be introduced because of differences in characteristics of the two photoelectric tubes. Detailed description in this respect is contained in our copending U.S. application Ser. No. 524,693 filed Feb. 3, 1966, to which reference may be used.

The level adjuster 27 is so designed that when the same solvent is put in the cells 20a and 20b, it reguates the signal passing therethrough so that a zero indication is effected on the ratio recorder. It also functions as a signal attenuator capable of very accurate calibrated attenuation of the signal passing therethrough. In operation, Inoperation, suppose that the same solvent is put in the cells 20a and 20b; that the attenuator 19a is adjusted to zero-attenuation, that is, to be fully open; and that the switch 23 is in position A. Then, the level adjuster 17 is adjusted so that the two signals applied to the recorder input terminals are at the same level and the indication on the recorder is zero. Such adjustment is quite conventional.

However, the following operations are quite new and characteristic slit-width the invention: A sample of an unknown high concentration is put in the cell 20b. The high concentration will greatly reduce the light energy of the unknown sample beam 17b and, consequently, the unknown sample signal. Then, the attenuator 19a in the path of the reference sample beam 17a is adjusted so as to reduce this beam to substantially the same level as the unknown sample beam. This reduces the reference sample signal to substantially the same level as the unknown sample signal. In response to the reduction of the reference sample signal, however, the slit-width control mechanism 24 operates to open the slit 14 wider than before to such an extent that the reference sample signal is kept at the same level as if there was no optical attenuation. There is a range wherein the slit can be changed without any substantial change in wavelength, but with substantial change in the amount of light energy passing through the slit. The slit used is operable to move within such a range.

On the other hand, when the slit 14 has thus been widened, the unknown sample beam is increased so that the unknown sample signal is magnified to such a degree that it reaches much the same level as the reference sample signal. With the switch having been thrown into position A, the unknown sample signal, now magnified as mentioned above, and the reference sample signal are applied to the two input terminals of the ratio recorder. Then, if the amount of optical attenuation is known, the concentration of the sample under measurement can be calculated from the ratio between the two signals as recorded on the recorder. It will be easily seen that the recorder can indicate the concentration of the unknown sample all the more accurately because the unknown sample signal is magnified to substantially the same level as the reference sample signal.

The amount of optical attenuation effected by the attenuator 19a can be known in the following manner: After adjusting the attenuator 19a in accordance with the above operation, the unknown sample in the cell 20b is replaced by the same reference sample as in the cell 20a, and then the switch 23 is thrown into the position B so that the signals from the amplifiers 22a and 22b will be applied to the input terminals 25b and 25a, respectively. Then the level adjuster 27, now functioning as a signal attenuator, is adjusted until the recorder 26 shows that both its input signals are at the same level. Then, read the amount of signal attenuation on the calibration of the adjuster 27 and the reading will show the amount of optical attenuation by the attenuator 19a.

Figure 2:
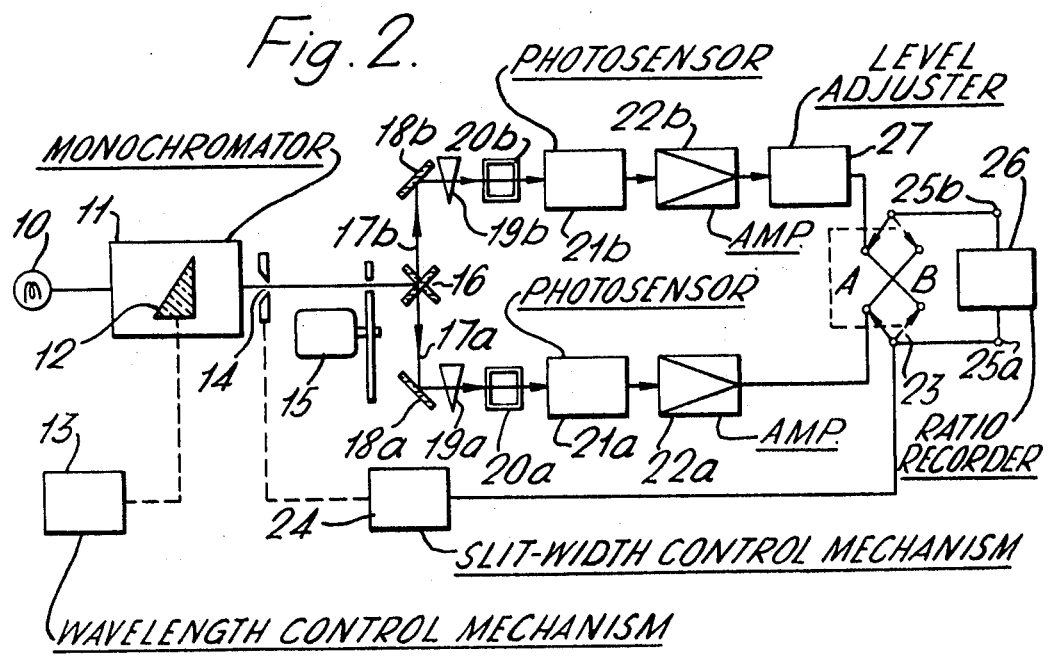
FIG. 2 is a schematic diagram of another embodiment of the invention.

In FIG. 2, besides the attenuator 19a, another similar attenuator 19b is provided in the path of the unknown sample beam in front of the cell 20b. For measurement of a sample of a very high concentration, the attenuator 19a on the reference sample side must be adjusted to an extremely narrow slit. It will be easier to adjust the attenuator 19b on the unknown sample side, which is fully open, to a slight degree.

In order to measure the difference spectrum of two samples, it is necessary to raise or lower the base line of absorbance. It will be easily seen that the provision of the two optical attenuators enable such operation effectively. It may be mentioned in this connection that if the difference in absorbance happens to be negative, it can be recorded as positive by means of the switch 23. Further explanation of FIG. 2 will not be necessary, with the corresponding components being designated by the same reference symbols in FIGS. 1 and 2.

Some preferred embodiments of the invention having been illustrated and described, it should be recognized that there are many modifications and changes thereof without departing from the true scope and spirit of the invention as defined in the appended claims.

We claim:

1. A spectrophotometer comprising: means for providing a monochromatic light at a sequence of wavelengths; means for selecting one of said wavelengths to be directed through a slit; means for spitting the monochromatic light of said selected wavelength into a first beam and a second beam; slit means in the path of said monochromatic light of selected wavelength, said slit means positioned between said wavelength selection means and said light splitting means, a first reference cell dispose in the path of said first beam; a second sample cell disposed in the path of said second beam; means positioned between said beam splitter and said reference cell for attenuating said first beam to reduce the intensity of said first beam to a level comparable with the intensity of said second beam that has passed through said sample cell; a first photosensor for detecting said first beam transmitted through said reference cell; a second photosensor for detecting said second beam transmitted through said sample cell; means operable in direct response to the reduction of the intensity of said first beam directly caused by the operation of said attenuating means to control the width of said slit means to compensate for said reduction so that said first and second signals are increased; and means having a first input terminal and a second input terminal for recording the ratio between the output signals from said first and second photosensors applied to said first and second input terminals, respectively, and means for selectively switching the output signals from said first and second input terminals of said recording means to their respective application to said second and first input terminals thereof means for adjusting the output signal of one of said first and second photosensors so that the signals applied to said first and second input terminals become equal where said sample and reference cells contain the same sample.

2. The spectrophotometer as defined in claim 1, further including means positioned between said beam splitting means and said sample cell for attentuating said second beam.